United States Patent Office 2,945,782
Patented July 19, 1960

2,945,782
DISINFECTANT COMPOSITIONS

Ernst Schraufstatter, Wuppertal-Elberfeld, Ernst Gottsacker, Wuppertal-Barmen, and Hermann Wolz, Leverkusen-Bayerwerk, Germany, assignors to Farbenfabriken Bayer Aktiengesellschaft, Leverkusen, Germany, a corporation of Germany No Drawing. Filed Aug. 7, 1956, Ser. No. 602,518

Claims priority, application Germany Aug. 11, 1955

3 Claims. (Cl. 167—30)

It is known that a number of arylalkanols containing one or several halogen atoms in the aryl radical have strong disinfecting power. Thus, for instance, in French Patent No. 885,966, the halogen derivatives of benzyl alcohol, α- or β-phenylethyl alcohol, γ-phenylpropyl alcohol, cinnamic alcohol and benzhydrol are mentioned as examples; a special high activity is attributed to the 3,4-dichlorobenzyl alcohol. The use of these disinfecting agents is handicapped by their low solubility in water, e.g. 3,4-dichlorobenzyl alcohol dissolves in water to 0.2 percent only. In practice, it is preferable to have concentrated aqueous solutions which are diluted with water prior to their application. For the preparation of highly concentrated disinfecting solutions it has been proposed to add quaternary ammonium compounds in order to increase the amount of the disinfectant which dissolves in water without the addition of quaternary ammonium compounds. However, quaternary compounds suffer from the disadvantage that they reduce the disinfecting action of aqueous solutions of halogen-containing arylalkanols, in particular their tuberculocidal action.

Now it has been found that highly concentrated aqueous solutions of disinfecting halogen-containing arylalkanols can be prepared by using as dissolving agent anion-active compounds, such as higher molecular alkylsulfates or -sulfonates, aralkylsulfonates, or alkylarylsulfonates, as well as monovalent or polyvalent alcohols, such as ethyl alcohol, isopropyl alcohol, glycol, polyglycol and glycerol.

According to the invention, the halogen-containing arylalkanols are e.g. first dissolved in the aforesaid monovalent or polyvalent alcohols, and the alcoholic solutions formed are then mixed with the aqueous solution containing the aforesaid anion-active compounds. In this manner, it is possible to substantially increase the concentration of the disinfecting agents in aqueous solutions without the disinfecting action being impaired.

The appropriate amount of the dissolving agents can easily be ascertained in a specific case by preliminary tests. Details are given in the following example.

The disinfecting compositions of the present invention and the diluted aqueous solutions obtainable therefrom, can be used for the most various purposes, for instance for disinfecting hands, instruments and linen as well as utensils and rooms. Furthermore, they can be used in agriculture for disinfecting stables and tools.

Example 15 grams of 3,4-dichlorobenzyl alcohol are dissolved in 20 grams of isopropyl alcohol and mixed with 65 grams of a 25 percent aqueous solution of a anion-active paraffin sulfonate which was produced according to the Example 1 of German Patent 715,747. A 15 percent aqueous solution was obtained.

An aqueous solution diluted at a proportion of 1:50 (=0.3% disinfecting agent) was found to destroy tubercle bacteria after 5 minutes. A solution diluted at a proportion 1:100 (=0.15% disinfecting agent) destroyed tubercle bacteria after 30 minutes. When using a 0.2 percent aqueous solution of 3,4-dichlorobenzyl alcohol, which did not contain propyl alcohol and paraffin sulfonate, tubercle bacteria were destroyed after 30 minutes. When using a 4 percent aqueous solution of 3,4-dichlorobenzyl alcohol in a 10 percent dodecyldimethyl-benzylammoniumchloride solution, tubercle bacteria were destroyed after 15 minutes, and after 3 hours, when this solution was applied at a dilution of 1:10.

We claim:
1. An aqueous composition which comprises water, a disinfecting amount of dichlorobenzyl alcohol, an alcohol solvent for said dichlorobenzyl alcohol, and an anion-surfactant selected from the group consisting of an alkyl sulfate, an alkyl sulfonate, an aralkyl sulfonate and an alkyl aryl sulfonate.

2. A composition of claim 1 wherein the dichlorobenzyl alcohol is 3,4-dichlorobenzyl alcohol.

3. An aqueous composition consisting of (1) a disinfecting amount of 3,4-dichlorobenzyl alcohol, dissolved in isopropyl alcohol and (2) an aqueous solution of an anion-active paraffin sulfonate.

References Cited in the file of this patent

FOREIGN PATENTS 885,966    France _____ Sept. 30, 1943

OTHER REFERENCES

Agr. Chem., vol. 11, No. 4, April 1956, pp. 42–45 and 136–137.

Jones: Soap and Sanitary Chem., November 1945, pp. 110–115, 155.

Jacobs: The Handbook of Solvents, D. Van Nostrand, 1953, pp. 343, 344, 473, 474, 417, 418, 415.

Reddish: Antiseptics, Disinfectants, Fungicides and Sterilization, Lea and Febiger (1954), pp. 298–314.

Frear: Chem. of Insecticides, Fungicides and Herbicides, 2nd ed., 1948, D. Van Nostrand, pp. 277–292.

Perry and Schwartz: Surface Active Agents, vol. I, Intersci Pub. Inc., 1949, pp. 9–10, 233–234, 82–94, 111–128.

Brown: Insect Control by Chem., John Wiley and Sons, 1951, p. 3.

Shepard: The Chem. and Action of Insecticides, 1951, McGraw-Hill, p. 169.

Frear: Chem. of the Pesticides, D. Van Nostrand, 3rd ed., 1955, pp. 415–418.

Cupples: U.S.D.A., Bur. of Entomology and Plant Quarantine, E-607, October 1943, pp. 1–3.